United States Patent
Spina et al.

[11] Patent Number: 5,526,930
[45] Date of Patent: Jun. 18, 1996

[54] LIGHT-TIGHT PACKAGE

[75] Inventors: John A. Spina, Rochester; John DePoint, Jr., Palmyra; Bradley A. Phillips, Honeoye Falls, all of N.Y.

[73] Assignee: Eastman Kodak Company, Rochester, N.Y.

[21] Appl. No.: 441,515

[22] Filed: May 15, 1995

[51] Int. Cl.$^6$ .................................. B65D 85/671
[52] U.S. Cl. .................. 206/410; 206/414; 206/416; 229/87.05
[58] Field of Search .................... 206/389, 395–398, 206/400, 407, 408, 413–416; 229/87.05

[56] References Cited

U.S. PATENT DOCUMENTS

| | | |
|---|---|---|
| 4,148,395 | 4/1979 | Syracuse et al. . |
| 4,505,387 | 3/1985 | Seto . |
| 4,733,777 | 3/1988 | Van Geyte et al. . |
| 4,911,299 | 3/1990 | Peeters . |
| 5,133,171 | 7/1992 | Chase et al. . |
| 5,174,095 | 12/1992 | Fujiwara et al. . |
| 5,222,601 | 6/1993 | Takahashi et al. . |
| 5,353,933 | 10/1994 | Takahashi et al. . |
| 5,447,829 | 9/1995 | Tamai et al. . |
| 5,452,797 | 9/1995 | Pollard . |

FOREIGN PATENT DOCUMENTS 2124969  12/1994  Canada .

OTHER PUBLICATIONS

Research Disclosure, May 1983, Item No. 22932.

*Primary Examiner*—Jimmy G. Foster
*Attorney, Agent, or Firm*—Susan L. Parulski

[57] ABSTRACT

An improved light-tight package for a roll (10) of a length (14) of web material such as photographic paper or film. The package includes an opaque leader (22) wound around the roll. Folded-over portions (48,50) of opaque tearable end disks (32,34) are held in place by tearable adhesive tape strips (44,46). The leader includes a portion adapted to initiate a tear in the tearable tape. Upon unrolling of the package by pulling the leader, the tape tears, and the end disks tear circumferentially, whereby the folded-over portions adhere to the leader when the leader separates from the roll.

18 Claims, 4 Drawing Sheets

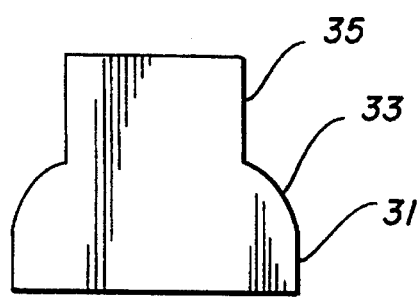
Fig. 5(a)
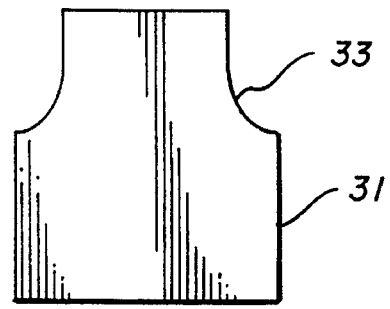
Fig. 5(b)
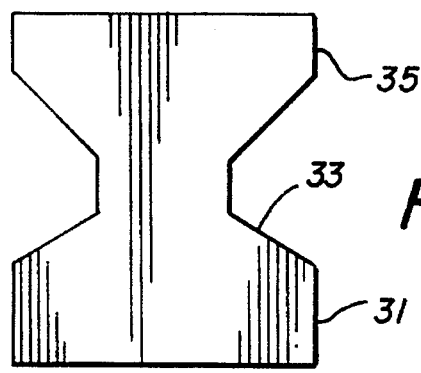
Fig. 5(c)
Fig. 5(d)
Fig. 5(e)
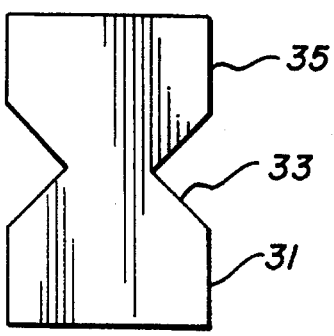
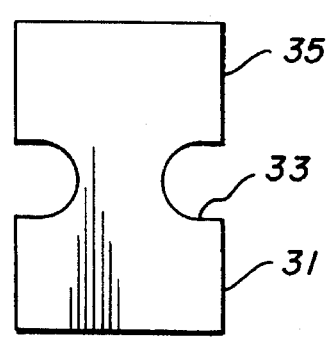
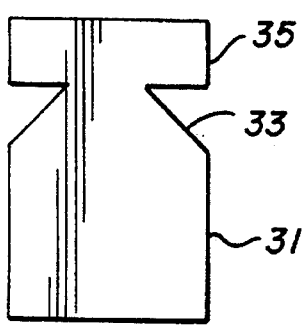
Fig. 5(f)    Fig. 5(g)    Fig. 5(h)

LIGHT-TIGHT PACKAGE

CROSS REFERENCE TO RELATED APPLICATIONS

This is application is related to U.S. Ser. No. 08/346,571 pending titled LIGHT TIGHT PACKAGE by S. Ritchie, M. Koelsch, and C. Young, filed 23 Jan. 1995, by same assignee.

This application is also related to U.S. Ser. No. 08/33,391, U.S. Pat. No. 5,492,221, titled LIGHT-TIGHT PACKAGE by S. Light J. Spina, and J. DePoint, filed 02 Nov. 1994, by same assignee.

This application is further related to U.S. Ser. No. 08/237, 488, U.S. Pat. No. 5,472,089, titled LIGHT-TIGHT AND PHYSICALLY PROTECTED PACKAGING FOR A ROLL OF PHOTOSENSITIVE WEB by V. Specogna, M. Koelsch, and K. Myers, filed 03 May 1994, by same assignee

FIELD OF THE INVENTION

The invention relates to packages for rolls of web material. More particularly, the invention relates to a light-tight package suitable for use with sensitized goods such as rolls of photographic paper and film.

BACKGROUND OF THE INVENTION

Rolls of light sensitive paper and film require light-tight packaging so that such rolls are not exposed to white or room light whereby the light sensitive characteristics of the rolls would be damaged. While such packaging must be light-tight, such packaging needs to facilitate the loading of the rolls in room light into cooperating apparatus which dispense or otherwise use the paper or film.

U.S. Pat. No. 4,148,395, commonly assigned, discloses a package which includes a pair of flexible opaque end disks or covers attached to the ends of a core of the roll, and an opaque leader attached to a leading end of the length of paper or film forming the roll. A peripheral portion on each end disk is folded over and adhered to an edge of an underlying convolution of the leader. A layer of adhesive is provided on the underside of the peripheral portion prior to folding over. When the leader is pulled away from the packaged roll, the end disks tear circumferentially at the edge of the roll; so that, the peripheral portion remains adhered to the leader. However, since the folded over portions tend to crimp or fold unevenly, passages for light tend to be formed between the folded over portions and the leader, which can allow light to reach and damage the paper or film.

U.S. Pat. No. 5,133,171, commonly assigned, discloses a package which includes a pair of similar end disks and a leader. After a first convolution of the leader is wrapped on the roll, peripheral portions of the end disks are folded over the first convolution. A second convolution is then wrapped onto the roll to capture the folded-over peripheral portions between the first and second convolutions and to make the package light tight. Friction is relied upon to retain the folded-over portions between the convolutions of leader and no adhesive is used. However, the frictional engagement between the folded-over portions and the convolutions of the leader occasionally is not sufficient to prevent the folded-over portions from slipping at least partially free, thereby permitting entry of light and damage to the product. The requirement for a second full convolution also adds expense to the product and produces additional waste material for the customer.

Research Disclosure No. 22932 of May 1993 shows a package in which the end disks have the same diameter as the roll. A strip of adhesive tape is wrapped around each of the circumferential edges of an outer convolution of the leader and then folded over onto the end disk. The folded over portions of the tape strips tend to crimp or fold unevenly, so that passages for light tend to be formed between the folded over portions and the end disks, which can allow light to reach and damage the paper or film. Extra components, such as an enclosing bag, may be necessary to ensure light tightness.

U.S. Pat. No. 5,353,933 discloses a package in which a light-shielding leader with covers is connected to the end of a photosensitive strip of material. The leader is wound twice around the roll, and the side edges of the covers are inserted into the core and fixed by the insertion of a bushing into the core with pressure. A notch is formed in the covers to ensure and facilitate opening at the forward end of the covers. When the leader is drawn, a pulling force acts on the notch, and the covers are torn along adhesion outside boundaries. Once torn, the covers extend or fan outwards from the core, which may adversely affect the ease of rotation when unwinding the web material from the core, resulting in image disturbance if an image is applied during unwinding. In addition, the extended covers may fold over if the web is re-wound back onto the roll, causing scratching of the photosensitive material. Further, providing notches in the covers results in an extra manufacturing step, and may tend to form light passages.

SUMMARY OF THE INVENTION

The objective of the present invention is to provide an improved light-tight package which remains properly closed until opened during room light loading.

Another object of the present invention is to provide such a package whose elements do not interfere with dispensing of the product after opening of the package.

A still further object of the present invention is to provide such a package in which no adhesive remains near the roll after opening of the package, thereby preventing contamination of the edges of the product of the cooperating apparatus with adhesive.

Yet another object of the present invention is to provide such a package in which a minimal amount of packaging material remains attached to the roll once loaded within the cooperating apparatus, so that the remaining packaging does not interfere with the operation of the roll within the cooperating apparatus.

Yet still another object of the present invention is to provide such a package which will allow for rewinding of the roll onto the core once loaded within the cooperating apparatus without damage to the product.

Still another object of the present invention is to provide such a package which will not interfere with the use of the product, particularly when an image is applied to the product as the product is being unwound from the roll.

These objects are given only to way of illustrative examples; thus, other desirable objectives and advantages inherently achieved by the disclosed invention may occur or become apparent to those skilled in the art. The scope of the invention is defined by the appended claims.

According to one aspect of the invention, there is provided a light-tight package. The package includes a core having opposite ends, and a length of light-sensitive web material wound about the core to form a roll. End surfaces are provided at the opposite ends of the core, while the web material has a first width and a leading end. A flexible opaque leader is wound about the roll through at least a first convolution. The leader has two ends and a first and second portion. The first portion is at one end of the leader, while the second portion is at the other end of the leader. The first portion includes an outer surface, a second width substantially equal to the first width, a length greater than a circumference of the roll, and a trailing end attached to the leading end of the web material. A pair of flexible tearable opaque end disks are provided for covering the end surfaces. A central portion of each end disk is attached to the core and a peripheral portion of each end disk is folded over a circumferential edge of the first portion of the leader. Each folded over portion has an outer surface and a circumferential edge. At least one strip of tearable adhesive tape is positioned along the circumferential edge of the folded over portion. The strip adheres to the outer surface of the folded over portion and to the outer surface of the first portion for at least one convolution. The second portion is adapted to initiate a tear in the tearable adhesive tape so as to tear the end disk along the circumferential edge of the folded over portion, whereby the folded over portion separates from the end disk and adheres to the leader.

The package according to the present invention provides important advantages over prior art packages. The use of adhesive strips ensures that the end disks will remain securely attached to the leader to provide a light tight package before the package is opened. When a roll wrapped in accordance with the invention is placed in a cassette, or other cooperating apparatus, the strip of leader is removed to open the package, whereby the adhesive strips remain with the leader. This is because the end disks tear circumferentially as the leader and adhesive strips are pulled away from the roll. Since the adhesive strips remain with the leader, there is no opportunity for contamination of the product by adhesive. The pull force to remove the leader is not increased substantially over the prior art packages. Once the leader is removed, the end disks do not interfere with the dispensing, rewinding, or with the structure of the cassette or cooperating apparatus, thereby allowing the roll to fit compactly within the cassette or cooperating apparatus. A much shorter leader is needed than with prior art packages since a second, full convolution of leader is not required for light tightness. Further, since the structure of the leader is adapted to initiate a tear in the tape, no additional manufacturing steps are required over prior art packages.

BRIEF DESCRIPTION OF THE DRAWING

The foregoing and other objects, features, and advantages of the invention will be apparent from the following more particular description of the preferred embodiments of the invention, as illustrated in the accompanying drawings.

FIGS. 5($a$)–5($h$) show several arrangements of leaders for the present invention.

DETAILED DESCRIPTION OF THE INVENTION

Figure 1:
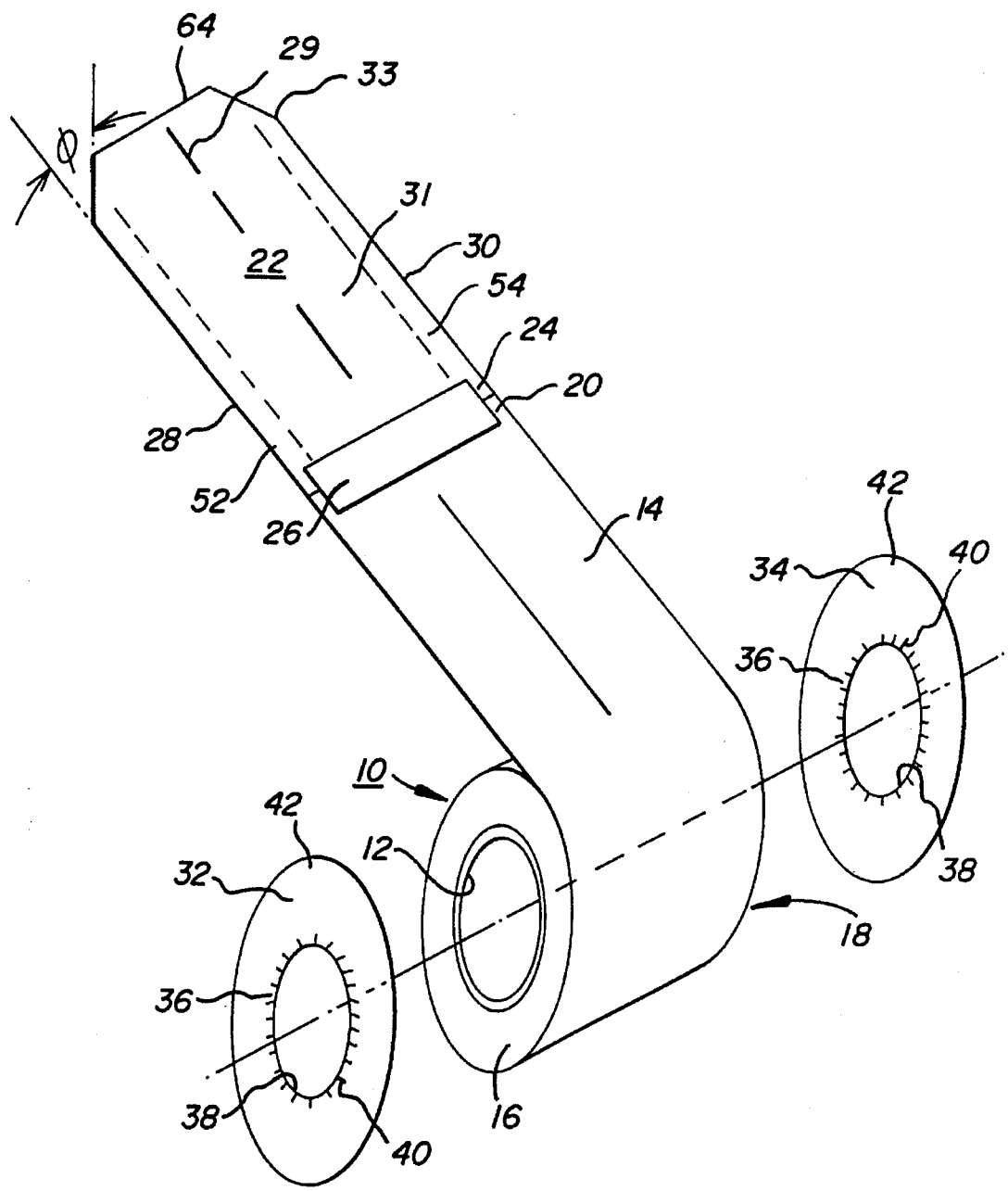
FIG. 1 illustrates schematically a perspective, exploded view of a roll of web material with a leader attached to the leading edge of the web material and two unattached end disks.

The following is a detailed description of the preferred embodiments of the invention, reference being made to the drawings in which the same reference numerals identify the same elements of structure in each of the several figures.

FIGS. 1 through 4 show a roll 10 of light-sensitive web material, such as photographic paper or film. The roll 10 includes a central, typically flangeless, hollow core 12 having opposite ends and a length approximately equal to the width of a length 14 of such web material. Length 14 is wound onto core 12 such that the wound roll 10 has opposite end surfaces 16,18. A leading end 20 of length 14 is joined to a flexible, opaque leader 22. Leader 22 includes a trailing end 24, and a width approximately equal to the width of length 14 of web material. To prevent inadvertent exposure of the product, the length of leader 22 is at least as long as one circumference of roll 10. Extra length may be included for grasping leader 22 by the customer.

Leader 22 may be made of various opaque materials, for example, polyester containing carbon black or rubber-modified high density polyethylene containing carbon black. A suitable carbon black content would be in the range of 3 to 8 percent by weight. A thickness of leader 22 would be in the range of 0.076 to 0.381 mm, preferably 0.127 to 0.254 mm, which provides suitable tensile strength. Adhesion means 26, such as a strip of tape, may be used to join ends 20 and 24. Other adhesion means 26 to attach ends 20,24 may include ultrasonic or heat splicing. Leader 22 has longitudinally extended lateral edges 28,30 and a centerline 29.

As illustrated in FIG. 1, leader 22 includes two ends, a first portion 31 having trailing end 24, and a second portion 33. First portion 31 is at one end of leader 22, while second portion 33 is at the other end of leader 22. The width of first portion 31 is substantially equal to the width of length 14, and the length of first portion 31 is greater than one times the maximum circumference of roll 10. Second portion 33 includes at least one feature adapted to initiate a tear in a tearable adhesive tape. Such a feature is, for example, a taper extending inwardly toward centerline 29. As illustrated in FIG. 1, such a taper may form an angle theta ($\phi$) with respect to lateral edge 28 or 30, with angle $\phi$ ranging between 0 and 90 degrees, preferably 30 to 45 degrees.

Figure 2:
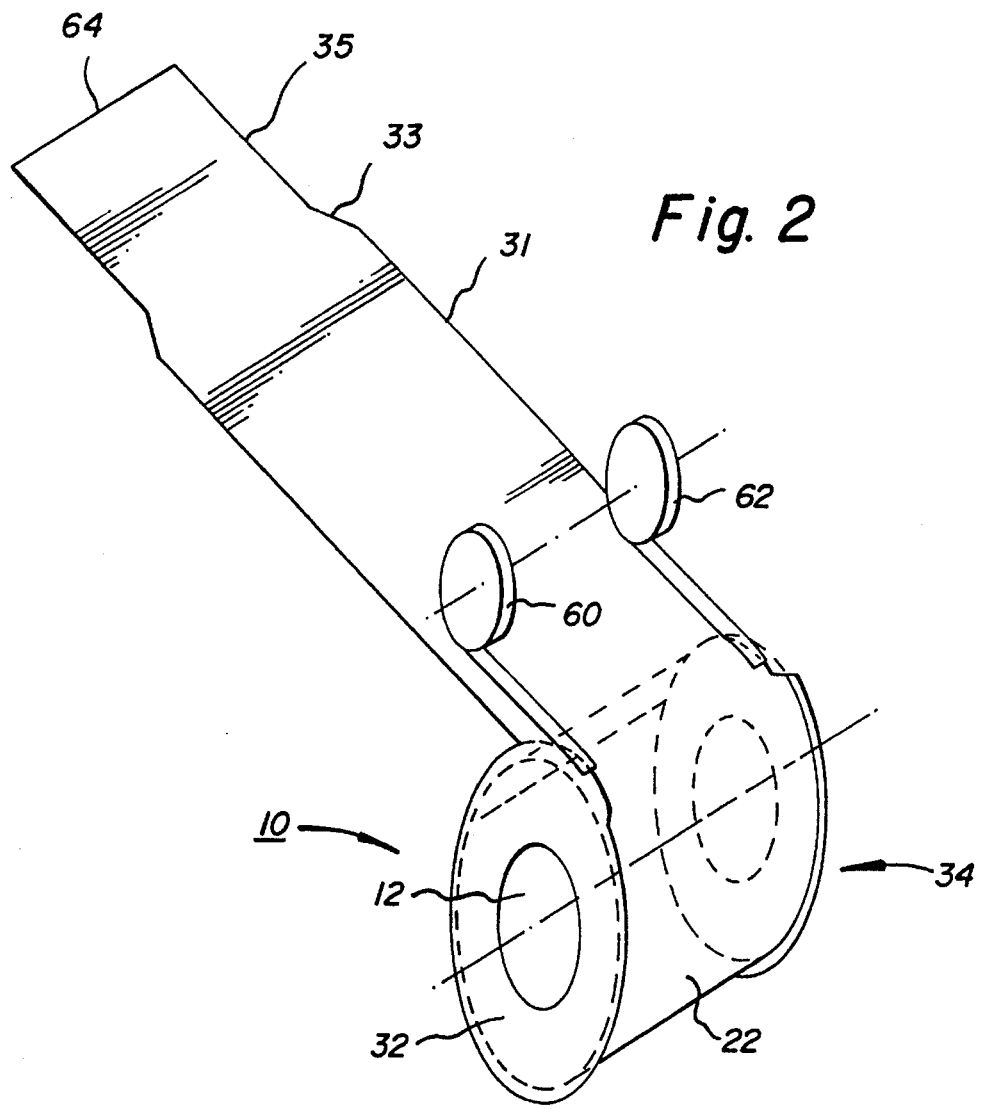
FIG. 2 illustrates a perspective view of the package of the present invention as it is assembled.

Alternatively, as illustrated in FIG. 2, leader 22 may include a third portion 35, arranged such that second portion 33 is intermediate first portion 31 and third portion 35. In such an embodiment, third portion 35 would have a width less than the width of first portion 31.

Figure 3:
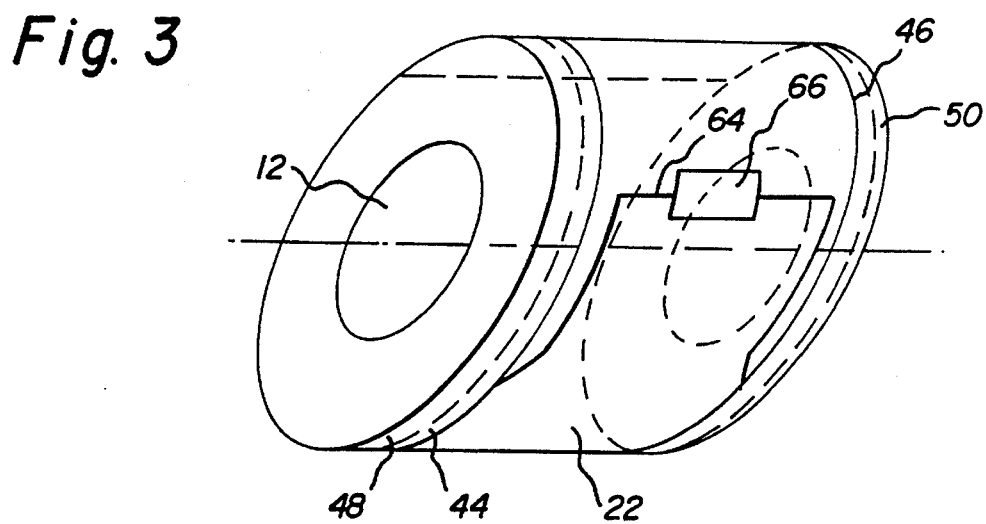
FIG. 3 illustrates a perspective view of a assembled package of the present invention.

Referring to FIGS. 1 through 4, a pair of flexible opaque end disks 32,34 are provided to cover end surfaces 16,18. Each disk 32,34 includes a central portion 36 with a hole 38 approximately smaller in diameter than an internal diameter of core 12. End disks 32,34 are made of an opaque but thin and flexible material which has a reduced tensile strength to permit circumferential tearing of end disks 32,34 when the assembled package is opened. Optionally, end disks 32,34 may include a plurality of radial cuts or slits 40 extending radially outward from hole 38 through the thickness of end disks 32,34 to facilitate attachment of end disks 32,34 to core 12. The portions of the disks between cuts 40 would be folded into core 12 and secured to core 12 using, for example, adhesive. A peripheral portion 42 of each end disk 32,34 extends somewhat beyond the radius of roll 10, between 5 and 16 mm, preferably 8 mm, to allow for variation in the diameter of roll 10. In the assembled package, peripheral portions 42 are folded over the circumferential edges of the first convolution of leader 22 onto the outer surface of leader 22, as illustrated in FIGS. 2 and 3.

As indicated, end disks may be made of an opaque but thin and flexible material which has a reduced tensile strength to permit circumferential tearing of end disks 32,34 when the assembled package is opened. The material should be modestly stiff. That is, the material should be flimsy to minimize interference with the product or adjacent structure during opening of the package, during unwinding of the roll, or rewinding of the roll within the cassette or cooperating apparatus. A suitable material which permits tearing is a paper, foil, polyethylene laminate. Other suitable materials for end disks 32,34 include any suitable polyolefine based film, plastic film, or lamination which could include high density polyethylene, polypropylene, cellophane, polyester, and various combinations thereof, which are opaque, flimsy, and have a tensile strength which permits tearing during use in the package according to the present invention.

Peripheral portions 42 are folded over onto the first convolution of leader 22 to form folded-over portions 48,50. Elongated strips 44,46 of adhesive tape secure folded-over portions 48,50 to leader 22. Strips 44,46 are wrapped around the outer surface of folded-over portions 48,50 and the outer surface of marginal portions 52,54 (shown in FIG. 1) of at least a first convolution of leader 22. Preferably, strips 44,46 extend over folded-over portions 48,50 to locations not beyond the lateral edge 28,30 of leader 22. Described alternatively, each folded over portion 48,50 has a circumferential edge, and strips 44,46 extend over folded-over portions 48,50 to locations not axially beyond the circumferential edge. Adhesive strips 44,46 extend along leader 22 for a distance appropriate to provide at least one full convolution around roll 10, though more than one convolution can be provided. While continuous strips of adhesive tape 44,46 are preferred, those skilled in the art will appreciate that several shorter overlapping, abutted, or intermittent lengths could be used without departing from the present invention, so long as any spacing between the shorter lengths does not permit entry of light. Further, particularly for rolls 10 having narrow widths, a single strip of adhesive tape may be used for both folded-over portions, rather than one strip for each folded-over portion. In addition, while the use of two strips is preferred, only one strip may be utilized, so long as there is no entry of light.

Adhesive strips 44,46 must be opaque and have a transverse width greater than the width of folded-over portions 48,50. Preferably, strips 44,46 have a transverse width of about twice the width of folded-over portions 48,50, with about half of this width being adhered to the folded-over portions and half to leader 22. Adhesive strips 44,46 preferably have the property of adhering well to leader 22 and to folded-over portions 48,50. In addition, strips 44,46 must have the characteristic of being tearable. Those skilled in the art will appreciate that any adhesive tape having these characteristics will be suitable. An example of such a suitable adhesive tape is Product No. 235, an opaque tape made by 3M Company, or Product No. 53137, an opaque tape made by Tesa Company.

To assemble the package according to the present invention, length 14 is wound onto core 12. Preferably after winding, end disks 32,34 are attached to core 12 at central portion 36. Trailing end 24 of leader 22 is attached to lead end 20 of length 14. Leader 22 is wound around roll 10.

Figure 4:
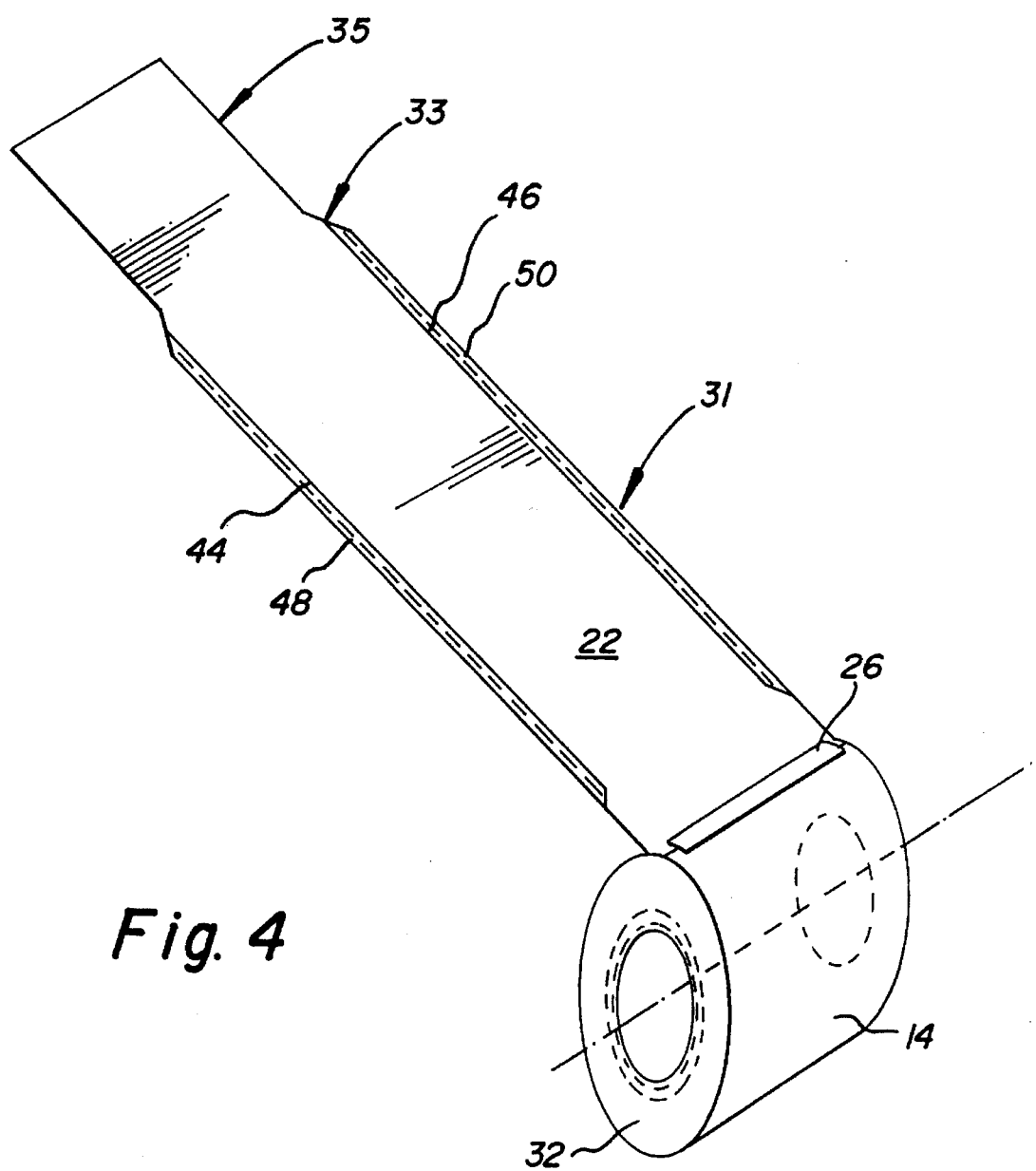
FIG. 4 illustrates a perspective view of a package of the present invention as it is torn from the roll.

Then, peripheral portions 42 are folded over onto leader 22, more particularly first portion 31, to form fold-over portions 48,50, as best illustrated in FIG. 3. As shown in FIGS. 3 and 4, folded-over portions further extend over all or a segment of second portion 33. The folding over may be done manually, or using any convenient apparatus. Strips 44,46 are then fed from suitable spools 60,62 and wrapped around the package, taking care to cover folded-over portions 48,50. Optionally, lead end 64 of leader 22 may be secured to roll 10 by any convenient manner, such as by means of tape strip 66, to provide a completed assembled light-tight package according to the present invention.

When the assembled package is opened in a cassette or cooperating apparatus, tape 66 is unsecured, and leader 22 is pulled away from roll 10. Typically, core 12 is supported by means (not illustrated) which engage core 12 and permit the assembled package to rotate as leader 22 is removed. In a cassette, leader 22 would be threaded through an exit slot which forms a light barrier and the cassette would enclose roll 10. Since strips 44,46 are made from a material which permits tearing, a pull on leader 22 eventually subjects second portion 33 to a force whereby the feature of second portion 33 initiates a tear in strips 44,46. The strength of leader 22 is such that the tear propagates along the feature of second portion 33 to the lateral edges 28,30 of first portion 31. End disks 32,34 are made from a material which permits tearing, and the tearing force is less than the force needed to unadhere folded-over portions 48,50 from leader 22. Accordingly, strips 44,46 adhere to folded-over portions 48,50, and end disks 32,34 tear along the circumferential edge of folded-over portions 48,50 and tear free from the remainder of the end disks. As illustrated in FIG. 4, when leader 22 has been completely pulled away from roll 10, folded-over portions 48,50 remain adhered to leader 22, and would exit the cassette with the leader. The operator can then remove tape strip 26, discard the leader, and thread leading end 20 of length 14 into the cooperating apparatus.

In the embodiment illustrated in FIG. 2, third portion 35 would have a width less than the width of first portion 31. More particularly, the width of third portion 35 would be approximately the width of first portion 31 minus at least two times the width of adhesive strips 44,46. Third portion 35 can be used to thread leader 22 through an exit slot in a cassette or cooperating apparatus, and provide grasping means for pulling away leader 22 from roll 10.

FIG. 5 illustrates other embodiments of the feature of second portion 33 adapted to initiate a tear in a tearable adhesive tape. FIG. 5(a) shows a convex curvature, while FIG. 5(b) shows a concave curvature. Other features which provide tearing of both the end disk and adhesive tape may be known to those skilled in the art. FIGS. 5(c) through 5(h) show configurations wherein third portion 35 has a width approximately equal to first portion 31. In using the configuration of FIGS. 5(c) through 5(h), adhesive strips 44,46 would be wrapped around first portion 31, while holding third portion 35 apart so as to not wrap adhesive strips around third portion 35; thus leaving third portion 35 free from adhesive strips 44,46.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

Parts List

| | |
|---|---|
| 10 | roll |
| 12 | core |
| 14 | length of web material |
| 16, 18 | opposite end surfaces of wound roll |
| 20 | leading end of web material |
| 22 | leader |
| 24 | trailing end of leader |
| 26 | adhesion means |
| 28, 30 | lateral edges of leader |
| 29 | centerline of leader |
| 31 | first portion of leader |
| 32, 34 | opaque end disks |
| 33 | second portion of leader |
| 35 | third portion of leader |
| 36 | central portion of end disks |
| 38 | hole in end disk |
| 40 | radial cuts or slits in end disk hole |
| 42 | peripheral portion of end disk |
| 44, 46 | strips of adhesive tape |
| 48, 50 | folded-over portions |
| 52, 54 | marginal portions of leader |
| 60, 62 | spools of adhesive tape |
| 64 | lead end of leader |
| 66 | securing means |

What is claimed is:

1. A light-tight package comprising:

a core having opposite ends;

a length of light-sensitive web material wound about the core to form a roll, the roll having end surfaces, the web material having a first width and a leading end;

a flexible opaque leader wound about the roll through at least a first convolution, the leader having a first and second portion, said first portion having (i) an outer surface, (ii) a second width substantially equal to the first width, and (iii) a length greater than a circumference of the roll, the leader being attached to the leading end of the web material;

a pair of flexible tearable opaque end disks for covering the end surfaces, a central portion of each end disk being attached to the core and a peripheral portion of each end disk being folded over a circumferential edge of the first portion of the leader, each folded over portion having an outer surface and a circumferential edge; and at least one strip of tearable adhesive tape having an edge, the edge of the strip positioned along the circumferential edge of the folded over portion, the strip adhering to the outer surface of the folded over portion and to the outer surface of the first portion for at least one convolution, the second portion adapted to initiate a tear in the tearable adhesive tape so as to tear the end disk along the circumferential edge of the folded over portion, whereby the folded over portion separates from the end disk and adheres to the leader.

2. The light-tight package according to claim 1 wherein said second portion includes a feature of a taper extending inwardly toward a centerline of the leader which initiates the tear in the tearable adhesive tape.

3. The light-tight package according to claim 2 wherein the taper of the second portion extends inwardly by an angle greater than zero degrees and less than or equal to 90 degrees.

4. The light-tight package according to claim 1 wherein there are two strips of the adhesive tape, one for each folded over peripheral portion.

5. The light-tight package according to claim 1 wherein the leader has two ends, the first portion being at one end of the leader and the second portion being at the other end of the leader.

6. A light-tight package comprising:

a core having opposite ends;

a length of light-sensitive web material wound about the core to form a roll, the roll having end surfaces, the web material having a first width and a leading end;

a flexible opaque leader wound about the roll through at least a first convolution, the leader having a first, second and third portion, the second portion intermediate of the first and third portion, the first portion having (i) an outer surface, (ii) a second width substantially equal to the first width, and (iii) a length greater than a circumference of the roll, the leader being attached to the leading end of the web material, the third portion having a third width less than the second width of the first portion;

a pair of flexible opaque end disks for covering the end surfaces, a central portion of each end disk being attached to the core and a peripheral portion of each end disk being folded over a circumferential edge of the first portion of the leader, each folded over portion having an outer surface and a circumferential edge; and at least one strip of tearable adhesive tape having an edge, the edge of the strip positioned along the circumferential edge of the folded over portion, the strip adhering to the outer surface of the folded over portion, the strip adhering to the outer surface of the first portion for at least one convolution, the second portion adapted to initiate a tear in the tearable adhesive tape so as to tear the end disks along the circumferential edge of the folded over portion, whereby the folded over portion separates from the end disk and remains adhered to the leader.

7. The light-tight package according to claim 6 wherein the second portion includes two side walls and a feature of a taper extending inwardly toward a centerline of the leader from at least one side wall which initiates the tear in the tearable adhesive tape.

8. The light-tight package according to claim 7 wherein the taper of the second portion extends inwardly by an angle greater than zero degrees and less than or equal to 90 degrees.

9. The light-tight package according to claim 6 wherein there are two strips of the adhesive tape, one for each folded over peripheral portion.

10. The light-tight package according to claim 9 wherein the second portion includes two side walls and a feature of a taper extending inwardly toward a centerline of the leader from both side walls which initiates the tear in the tearable adhesive tape.

11. The light-tight package according to claim 6 wherein the second and third portions each have an outer surface, and the tearable adhesive strip has a fourth width such that the tearable adhesive tape adheres to the outer surface of the first portion and second portion while not adhering to the outer surface of the third portion.

12. The light-tight package according to claim 6 wherein the tearable adhesive tape has a width, and the width of the third portion is less than the width of the first portion minus two times the width of the adhesive tape.

13. The light-tight package according to claim 6 wherein the leader has two ends, the first portion being at one end of the leader and the third portion being at the other end of the leader.

14. A light-tight package comprising:

a core having opposite ends;

a length of light-sensitive web material wound about the core to form a roll, the roll having end surfaces, the web material having a first width and a leading end;

a flexible opaque leader wound about the roll through at least a first convolution, the leader having a first, second and third portion, the second portion intermediate of the first and third portion, the first portion having (i) an outer surface, (ii) a second width substantially equal to the first width, and (iii) a length greater than a circumference of the roll, the leader being attached to the leading end of the web material, the third portion having an outer surface and a third width substantially equal to the second width of the first portion;

a pair of flexible opaque end disks for covering the end surfaces, a central portion of each end disk being attached to the core and a peripheral portion of each end disk being folded over a circumferential edge of the first portion of the leader, each folded over portion having an outer surface and a circumferential edge; and at least one strip of tearable adhesive tape having an edge, the edge of the strip positioned along the circumferential edge of the folded over portion, the strip adhering to the outer surface of the folded over portion, the strip adhering to the outer surface of the first portion for at least one convolution while not adhering to the outer surface of the third portion, the second portion adapted to initiate a tear in the tearable adhesive tape so as to tear the end disks along the circumferential edge of the folded over portion, whereby the folded over portion separates from the end disk and remains adhered to the leader.

15. The light-tight package according to claim 14 wherein said second portion includes a feature of a taper extending inwardly toward a centerline of the leader which initiates the tear in the tearable adhesive tape.

16. The light-tight package according to claim 14 wherein the taper of the second portion extends inwardly by an angle greater than zero degrees and less than or equal to 90 degrees.

17. The light-tight package according to claim 14 wherein there are two strips of the adhesive tape, one for each folded over peripheral portion.

18. The light-tight package according to claim 14 wherein the leader has two ends, the first portion being at one end of the leader and the third portion being at the other end of the leader.

* * * * *